Patented Nov. 25, 1930

1,782,747

UNITED STATES PATENT OFFICE

ROBERT EMANUEL SCHMIDT, OF ELBERFELD, GERMANY, ASSIGNOR TO GENERAL ANILINE WORKS, INC., OF NEW YORK, N. Y., A CORPORATION OF DELAWARE

PROCESS OF SPLITTING OFF SULPHOGROUPS FROM ANTHRAQUINONE SULPHONIC ACID DERIVATIVES

No Drawing. Application filed April 13, 1926, Serial No. 101,780, and in Germany April 17, 1925.

I have found new and useful improvements in processes of splitting off sulphogroups from anthraquinone sulphonic acid derivatives.

If substituted anthraquinone sulphonic acids are treated with reducing agents two types of reduction products are obtained. In strongly alkaline solution leuco compounds are obtained of which the generally accepted formula is

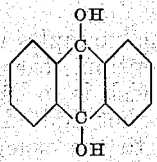

the other substituents being omitted. These leuco compounds revert easily into the parent material by oxydation in caustic alkali solution as for instance by oxygen from the air, they behave like typical vat dyestuffs.

I have now found that by reducing certain substituted anthraquinone sulphonic acids in substantially neutral solutions, i. e., in slightly acid, neutral or weakly alkaline solutions, different reduction products are obtained. Such weakly alkaline solutions are for instance aqueous solutions of soda ash, potassium carbonate, pyridine etc. Caustic alkali ammonia etc. may also be used provided they are employed in very dilute solutions. These new reduction products, which will be characterized further on, are distinguished from the above leuco compounds by the fact that their alkaline solutions are not readily oxidized by air to form the parent material. They are however oxidized in acid solution, as for instance by means of persulfats into the corresponding anthraquinone sulphonic acids. For convenience sake and in as much as we can not assign definite structural formulas to these novel reduction products I will designate them by the name hydrocompounds.

The leuco compounds can be converted into the hydro-compounds by the action of weak alkali such as soda ash, pyridine, diluted caustic alkali solutions etc.

I have furthermore found that these hydrocompounds will, with the greatest facility, split off one sulpho group, which is eliminated as sulphurous acid or a salt thereof. This clearly distinguishes my novel process from heretofore known means of eliminating sulpho groups from anthraquinone sulphonic acids. The reaction in those cases was one of hydrolysis by which the sulpho group is eliminated in form of sulfuric acid.

This reaction occurs particularly well with hydroxy-, amino-, substituted amino-anthraquinone-sulphonic acids, or such anthraquinone sulphonic acids containing several like or different substituents, as is illustrated in the examples given further on. Other substituents in the anthraquinone nucleus do not seem to influence materially this reaction. I wish it to be understood that under the term anthraquinone sulphonic acid derivatives as used herein I understand such compounds as contain at least one of the groups hydroxy, amino or substituted amino; i. e., alkyl amino, or several like or different of the above substituents.

A particularly advantageous method of achieving this reaction is to treat the hydrocompounds with alkaline agents. A sulpho group is eliminated in the form of sulfurous acid and an anthraquinone derivative is formed containing one sulphonic acid group less than the original compound. The reaction may be explained by admitting that one of the additional hydrogen atoms attaches itself to the $-SO_3H$ group, which is split off as sulfurous acid, the other one replaces the so eliminated sulpho group.

I have no exact knowledge of the structural formula of the hydroproduct, but as a mere matter of illustrating the invention a formula of the following type might be assumed—

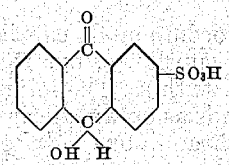

the other substituents being omitted. The reaction would then proceed as follows, the arrows indicating the migration of the hydrogen atoms.

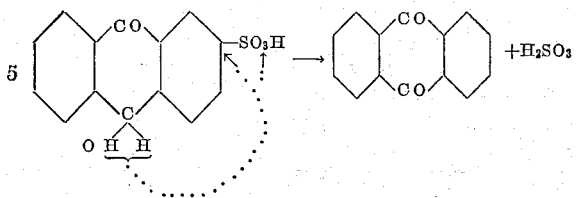

Other desmotrope formulæ for the hydrocompounds may be as well justified; it is even possible that the hydrogenation takes place at one of the benzene nuclei; the reaction could then be represented by a graphical equation as follows:

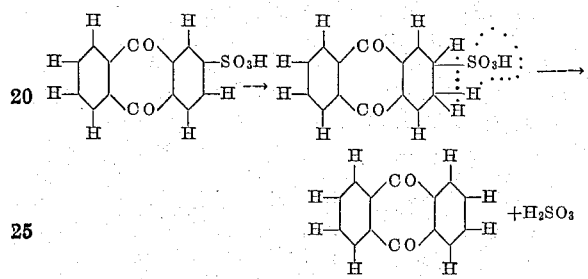

The reaction proceeds in a very easy and smooth way. It is finished in a few moments at room temperature, by using a slight excess of caustic soda in dilute water solution. Weaker alkalies such as ammonia or soda ash can likewise be used; the reaction then takes more time at room temperature, but is quite speeded up by increasing the temperature. Heating of water solutions of the alkali metal salts of the hydrocompounds is, in many cases, sufficient to eliminate the sulpho group. In this case an alkali metal bisulfite is formed and I wish it to be understood that alkali metal bisulfite and other similar salts are included in the term alkaline agents as used herein.

When starting from pure anthraquinone sulphonic acids of the type described herein the desulfonated products are obtained directly in a pure and mostly crystalline form.

The ease with which this novel reaction proceeds in dilute acid neutral or weakly alkaline solutions under ordinary conditions constitutes a remarkable technical advance over the heretofore known processes of eliminating sulpho groups from anthraquinone sulphonic acids. It is furthermore applicable in numerous instances when the old processes fail to work or give rise to undesirable by-products.

The hydrocompounds can be isolated and obtained in substance, but it is usually not necessary to do this. The solutions of the hydrocompounds as obtained directly by reducing the anthraquinone sulphonic acid compounds can be treated immediately with an alkaline agent; this is a very valuable simplification of my novel process.

Anthraquinone sulphonic acids containing several sulpho groups can be so treated as to split off successively one after the other sulpho group. In reacting upon such material with sufficient amounts of a reducing agent and an alkaline agent, the splitting off of the several sulpho groups is achieved in a single operation.

Another convenient reagent which eliminates a sulpho group from the hydrocompounds is concentrated mineral acid, particularly sulfuric acid. This reaction is achieved by dissolving the hydrocompounds in concentrated sulphuric acid and heating this solution. Sulfur dioxide is evolved and when the reaction mass is poured into water the desulphonated product separates. This reaction can be improved by the addition of boric acid.

The hydrocompounds are very conveniently obtained by treating the anthraquinone sulphonic acid compounds with alkali metal hydrosulfites, but other reducing agents as for instance zinc dust in diluted acetic acid are just as well suited to produce this reaction.

The following examples will further illustrate my invention, the parts being by weight, but I wish it to be understood that my invention is not limited to the particular substance, nor to the exact reaction conditions mentioned.

*Example 1.*—15 parts of 1-amino-4-hydroxy-anthraquinone-3-sulphonic acid (free acid) of the formula

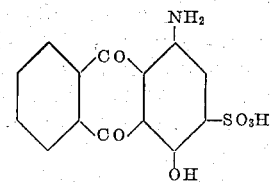

are suspended in 2000 parts of water and brought into solution by the addition of a solution of 30 parts of crystallized sodium carbonate in 200 parts water. 12 parts of (86%) sodium hydrosulfite ($NaS_2O_4$) are added to the above solution at room temperature. The violet color of the solution quickly changes to yellow. Addition of about 850 parts of a cold, saturated potassium chloride solution precipitates golden-yellow, beautiful needles, which constitute the monopotassium salt of the hydrocompound. This precipitate is filtered off, washed with a little alcohol and dried at low temperature.

This hydrocompound is dissolved in water and the solution heated on the water bath; pure 1-amino-4-hydroxy-anthraquinone separates as fine crystals. Addition of ammonia or soda ash to the above solution and heating on the water bath speeds up the elimination of the sulpho group. If the solution is made alkaline with caustic alkali the reaction is finished in a few instants at ordinary temperature. The sulphurous acid formed in this reaction can easily be detected in all of the above solutions by acidifying.

It is, however, not necessary to isolate the hydrocompound as described above. The solution as obtained when the 1-amino-4-hydroxy-anthraquinone-3-sulphonic acid is reduced with sodium hydrosulphite ($Na_2S_2O_4$), is heated on the water bath, and the 1-amino-4-hydroxy-anthraquinone separates directly well crystallized; or if caustic soda is added to the same solution, its yellow color turns immediately violet and the difficulty soluble sodium salt of the 1-amino-4-hydroxy-anthraquinone separates.

*Example 2.*—43 parts of p-diamino-anthrarufin-2-6-disulphonic acid of the formula

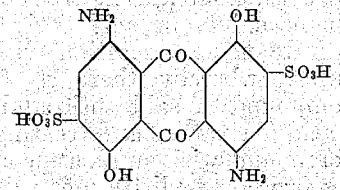

are dissolved in 4000 parts of hot water. After cooling to 30–40° C. 15 parts of (86%) sodium hydrosulphite ($Na_2S_2O_4$) are added to this blue solution; the color quickly changes to an orange-yellow. Upon adding 400 parts of 40% sodium bisulphite ($NaHSO_3$) solution the sodium salt of the hydrocompound separates in the form of violet-brown needles; these are filtered off, washed with absolute alcohol and dried at low temperature. The hydrocompound is soluble in water with a yellowish-red color, which upon addition of hydrochloric acid turns yellow. By adding soda ash to a water solution of the hydrocompound and heating on the water bath, the yellowish-red color turns violet-blue and the p-diamino-anthrarufin-monosulphonic acid, obtained by the splitting off of a sulpho group from the hydrocompound, soon separates. The sulpho group is split off at ordinary temperature if caustic soda is added to the water solution of the hydrocompound.

As has been stated heretofore, it is not necessary to isolate the hydrocompound. 275 parts of caustic soda solution (33%) are added directly at room temperature to the reduction liquor as obtained above; the color of the solution changes from red to a greenish-blue and the sodium salt of the monosulphonic acid quickly separates. It is filtered off, washed, dried and identified in the usual way.

*Example 3.*—10 parts of the hydrocompound of the p-diamino-anthrarufin-disulphonic acid as obtained according to Example 2 are dissolved in 150 parts of concentrated sulphuric acid, 5 parts of boric acid are added, and the mixture heated on the water bath. The yellow color of the solution gradually turns blue and sulphur dioxide is evolved. After the color does not change any more the reaction mass is poured into 1500 parts of water and the p-diamino-anthrarufin-monosulphonic acid separated and is filtered off.

*Example 4.*—The hydrocompound of the 1-amino-4-hydroxy-anthraquinone-3-sulphonic acid obtained according to Example 1 is dissolved in concentrated sulphuric acid and with addition of boric acid heated on the water bath, the originally yellow color of the solution turns bluish-red with a vermillion red fluorescence, indicating the formation of the 1-4-amino-hydroxy-anthraquinone. This is isolated in the usual way.

*Example 5.*—The p-diamino-anthrarufin-mono-6-sulphonic acid as obtained in Example 2 is dissolved in water and sodium hydrosulphite ($Na_2S_2O_4$) added until the color of the solution has taken a yellowish-red color. Soda ash is now added to this solution and heated on the water bath. The color changes quickly to a violet and a brownish-violet precipitate separates, which is substantially pure p-diamino-anthrarufin.

*Example 6.*—21,5 parts of p-diamino-anthrarufin-disulphonic acid are dissolved in 2000 parts of water and a solution of 30 parts of crystallized sodium carbonate in 200 parts of water added. 18 parts of (86%) sodium hydrosulphite ($Na_2S_2O_4$) are now quickly introduced and the yellowish-red solution obtained heated on the water bath. The color of the solution soon turns a violet and a brownish-violet precipitate separates. The heating is continued for 3–4 hours and after the cooling, the precipitate filtered off. It is then boiled in diluted caustic soda solution, acidified and the precipitate filtered off; it consists of very pure p-diamino-anthrarufin.

*Example 7.*—10 parts of p-dimethylamino-anthrarufin-2-6-disulphonic acid of the formula

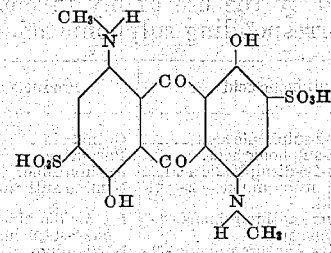

are dissolved in 200 parts of water and at 60°, while stirring, 3,8 parts of sodium hydrosulphite ($Na_2S_2O_4$) added. The greenish-blue solution immediately becomes orange with formation of the hydrocompound containing two additional hydrogen atoms; it can easily be obtained in solid form by salting out this solution. 14 parts caustic soda solution of 33% strength are now added; the color of the solution turns blue and the monosulphonic acid begins to separate. The precipitation is completed by the addition of sodium chloride. The free monosulphonic acid can also be obtained by acidifying the hot solution. The compound obtained has most likely the formula:

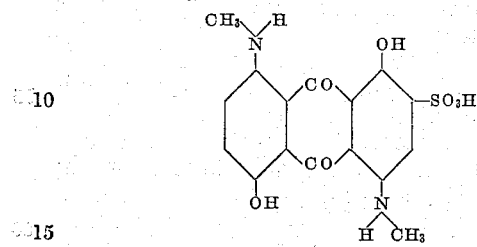

*Example 8.*—30 parts p-dimethylamino-anthrarufin-disulphonic acid are dissolved at 60° in 1100 parts of water containing 30 parts of crystallized sodium carbonate. 25 parts of (82%) sodium hydrosulphite ($Na_2S_2O_4$) are then added, the color of the solution changing from greenish-blue to orange. The temperature is now increased to 80° C., a solution of 70 parts of crystallized sodium carbonate in 200 parts of water is added and heated to 95° C. The orange color of the solution changes from red to blue and an abundant precipitate separates. After it does not increase any further, it is filtered off, heated with dilute acetic acid, filtered again and washed neutral with water. The product obtained is the 4-8-dimethylamino-anthrarufin of the formula

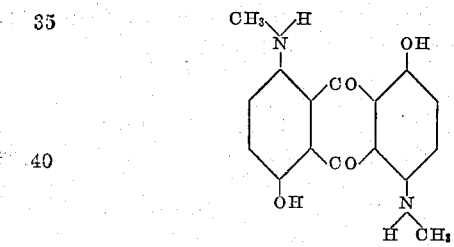

In the table below additional anthraquinone compounds are given, which have been obtained by the use of my invention, from their corresponding sulphonic acids:

| Sulphonic acid | Products obtained |
|---|---|
| Quinizarine-2-sulphonic acid | Quinizarine. |
| Purpurine-3-sulphonic acid | Purpurine. |
| Anthrarufin-2-6-disulphonic acid | Anthrarufine. |
| 1 - amino - anthraquinone - 2 - sulphonic acid. | 1-amino-anthraquinone. |
| 1 - 5 - diamino - anthraquinone - 2 - 6-disulphonic acid. | 1 - 5 - diamino - anthraquinone-2-sulphonic acid. |
| 1 - 5 - diamino - anthraquinone - 2 - 6-disulphonic acid. | 1-5-diamino-anthraquinone. |
| 1 - amino - 4 - bromoanthraquinone-2-sulphonic acid. | 1 - 4 - amino - bromo - anthraquinone. |

The 1-5-diamino-anthraquinone-2-sulphonic acid is hardly obtainable by any other process than the one described herein.

The p-diamino-chrysazine-2-7-disulphonic acid as well as the p-diamino-anthrarufine-2-7-disulphonic acid when subjected to my novel process will produce the corresponding sulphonic acids or diamino-dihydroxy-anthraquinone.

The term "hydro compounds" used in the claims is intended to comprise the compounds obtainable by reducing the substituted anthraquinone sulphonic acids in a substantially neutral or weakly alkaline solution as more fully described in the specification. The hydro compounds are distinguished from the corresponding leuco compounds by the fact that their alkaline solution is not readily oxidized by means of air to form the parent material. Furthermore, they will, with the greatest facility, split off a sulpho group which is eliminated as sulfurous acid or a salt thereof.

I claim:

1. The process of splitting off a sulpho group from an anthraquinone sulphonic acid derivative which comprises treating the anthraquinone sulphonic acid derivative in a substantially neutral solution with sodium hydrosulfite whereby there is formed a hydrocompound of said anthraquinone sulphonic acid derivative, and treating the said hydrocompound with an alkaline agent.

2. The process of splitting off a sulpho group from an anthraquinone sulphonic acid derivative which comprises treating the anthraquinone sulphonic acid derivative in a substantially neutral solution with sodium hydrosulfite whereby there is formed a hydrocompound of said anthraquinone sulphonic acid derivative, and treating the said hydrocompound with a solution of caustic soda.

3. The process of splitting off a sulpho group from an anthraquinone sulphonic acid derivative which comprises treating the anthraquinone sulphonic acid derivative in a substantially neutral solution with an alkali metal hydrosulfite whereby there is formed a hydrocompound of said anthraquinone sulphonic acid derivative and treating the said hydrocompound with an alkaline agent.

4. The process of making an alpha-dimethyl-amino-alpha-dihydroxy-anthraquinone monosulphonic acid which comprises reducing the coresponding disulphonic acid to form a hydro-compound by heating the same in a weak hydrosulfite solution and then splitting off one sulpho group by the addition of an amount of caustic soda such that the solution contains about 2% thereof.

5. The process of making an alpha-dimethyl-amino-alpha-dihydroxy-anthraquinone monosulphonic acid which comprises reducing the corresponding disulphonic acid to form a hydro-compound by heating the same in a weak hydrosulfite solution and then splitting off one sulpho group by the addition of an amount of an alkaline agent such that the solution contains about 2% thereof; the solution having a temperature not greater than about 60° C. during the two steps.

6. The process of making 4.8-dimethylamino-1.5-dihydroxy-anthraquinone-monosulphonic acid of the formula

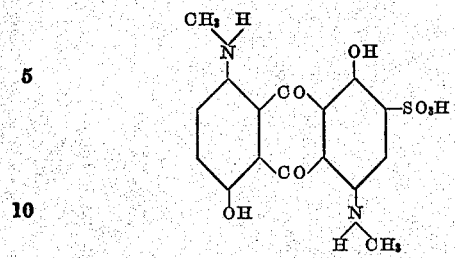

which comprises reducing 4.8-dimethylamino-1.5-dihydroxy-anthraquinone-2.6-disulphonic acid to form a hydro-compound and heating the latter at about 60° C. in an alkaline solution containing about 2 percent of caustic soda.

7. The process which comprises dissolving 10 parts of p-dimethylamino-anthrarufine-2-6-disulphonic acid in 200 parts of water, adding while stirring 3,8 parts of sodium hydrosulfite, at a temperature of about 60° C. until the solution becomes orange, thereafter adding 14 parts of caustic soda solution of 33% strength while maintaining the temperature at about 60° C. and precipitating the reaction product by the addition of sodium chloride.

In testimony whereof I have hereunto set my hand.

ROBERT EMANUEL SCHMIDT.